(12) United States Patent
Beyda et al.

(10) Patent No.: US 6,173,054 B1
(45) Date of Patent: Jan. 9, 2001

(54) ADAPTIVE CALL PROGRESS TONE DETECTION SYSTEM

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Under 35 U.S.C. 154(b), the term of this patent shall be extended for 0 days.

(21) Appl. No.: 09/074,306

(22) Filed: May 6, 1998

(51) Int. Cl.[7] .................................................. H04M 11/00
(52) U.S. Cl. ........................ 379/386; 379/372; 379/93.29
(58) Field of Search ................................... 379/386, 381, 379/372, 286, 93.29

(56) References Cited

U.S. PATENT DOCUMENTS

| | | |
|---|---|---|
| 4,477,698 | 10/1984 | Quinn . |
| 4,841,561 * | 6/1989 | Hill ..................................... 379/93.29 |
| 4,852,151 | 7/1989 | Dittakavi et al. ....................... 379/97 |
| 4,868,863 * | 9/1989 | Hartley et al. ..................... 379/93.29 |
| 4,935,958 * | 6/1990 | Morganstein et al. ................ 379/356 |
| 5,063,593 | 11/1991 | Kwon ................................... 379/386 |
| 5,134,648 * | 7/1992 | Hochfield et al. ................. 379/93.29 |
| 5,349,254 | 9/1994 | Sakarya ................................ 307/525 |
| 5,406,621 * | 4/1995 | Binal .................................... 379/351 |
| 5,642,406 * | 6/1997 | Gahang ................................. 379/386 |
| 5,699,413 | 12/1997 | Sridhar .................................... 379/98 |
| 5,712,977 * | 1/1998 | Glad et al. ......................... 379/93.29 |

FOREIGN PATENT DOCUMENTS 0 525 487    2/1993   (EP) .

OTHER PUBLICATIONS

"A Front–End Processor for Modems"; IEEE Journal of Solid–State Circuits, vol. 24, No. 6; Dec. 1, 1989, pp. 1634–1638.

* cited by examiner

*Primary Examiner*—Stella Woo

(57) ABSTRACT

A system and apparatus for enabling communications devices to recognize call progress tones that may be used in foreign countries. The call progress tone detection system includes a communications device (50) having one or more frequency decoders (113) for determining the frequency of call progress tones, a cadence decoder (126) for determining the on/off pattern for the call progress tones and a table (122) for storing the call progress tone frequencies and the cadences. Recognition of call progress tones is accomplished by enabling the communications device (50) to receive one or more foreign call progress tones, enabling the user to associate the type of call progress tone for each call progress tone received and storing each call progress tone to a table (122) for later cross reference when initiating a call.

18 Claims, 5 Drawing Sheets

ADAPTIVE CALL PROGRESS TONE DETECTION SYSTEM

BACKGROUND OF THE INVENTION

1. Field of the Invention

The present invention generally relates to a call progress tone detection system and, more particularly, to an adaptive call progress tone detection system for enabling communications devices to recognize a variety of different call progress tones.

2. Description of the Prior Art

It is well known that modern communication devices, such as modems, may initiate calls to remote modems by dialing the telephone number of the remote device. The modem, upon dialing, will monitor the telephone line to determine the kind of tones being returned by the PSTN (Public Switched Telephone Network). For example, these tones, which are known as call progress tones, may include a ring back tone, busy tone, dial tone, etc. These various tones are generally audible tones that are used to indicate the state of the call, such as the remote device being busy, the modem placing the line off hook, or the line ringing at the remote device. The tones are generated by an exchange in the PSTN (network) and detected by a subscriber (user). The call initiating device, such as a modem or other communications device, is able to recognize the frequency and cadence (on/off pattern) of the tones and may determine the action it should take based on the particular tone received.

For example, a modem, in initiating a connection to a remote device, will first normally place the telephone line off hook. At that point, the modem is expecting to receive a dial tone. The dial tone, which may be at a certain frequency, once detected by the modem, will then cause the modem to initiate a call to the number of the remote device to be accessed. Upon completion of the dialing of the numbers, the modem waits for a further progress tone to be generated by the network. If the next progress tone is a busy tone, the modem may display a message on the user's computer, notifying the user that the number dialed is busy. However, if the modem receives a ring back tone, it will continue ringing the remote device until an answering tone is received from the remote device or until the modem terminates its dialing procedure.

However, call progress tones and cadences may differ from country to country. Thus, one of the most difficult problems facing the user who requires analog tone recognition is the variability of these tones when calling to or from different parts of the world, thereby necessitating the sale of country specific modems by the manufacturer. Generally, the problem is experienced by the laptop computer-carrying international user, who, for example, may plug his or her machine into a phone jack in another country only to find that the dial tone and cadence resembles that of the user's nation's default busy tone, and thus every attempt is voided by the modems misrecognition of this tone.

Unfortunately, the international traveler may have no other choice than to purchase a country specific communications device, such as a modem, for each country the traveler is visiting. However, such an option is expensive and may cause a great deal of inconvenience to a user who may be forced to remove and install a different modem each time the user enters or leaves a country. Thus, there is no way to manually dial the modem call. A similar problem may apply in a number of other applications as well, such as when sending faxes overseas.

Therefore, what is needed is a system for enabling adaptive call progress tone detection to initiate a learning mode in the call initiating device to enable the device to learn the appropriate tones for the country in question, adapt to the newly learned tones and complete the call to the remote device.

SUMMARY OF THE INVENTION

Briefly, the present invention relates to a system and apparatus for enabling communications devices to recognize call progress tones that may be used in foreign countries. Recognition of such call progress tones is accomplished by enabling the communications device to receive one or more of the foreign call progress tones and store the foreign call progress tones to a table for later cross reference in determining the meaning of each call progress tone.

The call progress tone detection system includes a communications device having one or more frequency decoders for determining the frequency of call progress tones, a cadence decoder for determining the on/off pattern for the call progress tones and a table for storing the call progress tone frequencies and the cadences. Therefore, in a particular embodiment of the invention, when a communications device receives a particular call progress tone, the communications device may determine the tone's frequency and cadence and save that information to a table. Furthermore, the system enables the user to associate the type of call progress, such as busy tone, dial tone, ring back tone, etc. for each call progress tone stored in the table. Thus, when the communications device is communicating with another communications device located in a foreign country, the table may be referenced by the system to determine the particular call progress tone frequencies and cadences used in the country where the device being called is located, in order to successfully complete the call.

BRIEF DESCRIPTION OF THE DRAWINGS

Other features, objects and advantages of the present invention will become readily apparent and understood upon consideration of the following detailed description and attached drawings, wherein.

DETAILED DESCRIPTION OF THE INVENTION

The present invention relates to a system for enabling communications devices to recognize the call progress tones used in foreign countries. Recognition of such tones is achieved by enabling the call originating communications device to receive one or more of the call progress tone frequencies, decode the frequency of each call progress tone and store the frequency to a table. The table entries may then manually be associated with the type of call progress tone, such as busy tone, ring back tone, dial tone, etc. The table may further include an entry for naming the particular country and/or city in which the call progress tone originated. Thus, an important aspect of the invention relates to enabling communications devices to decode call progress tone frequencies.

Another important aspect of the invention relates to the call progress tone detection system determining the particular on/off pattern or cadence of the call progress tones. In particular, the present invention may sample the call progress tones at predefined intervals to determine the particular cadence associated with each type of call progress tone being received by the user.

Figure 1:
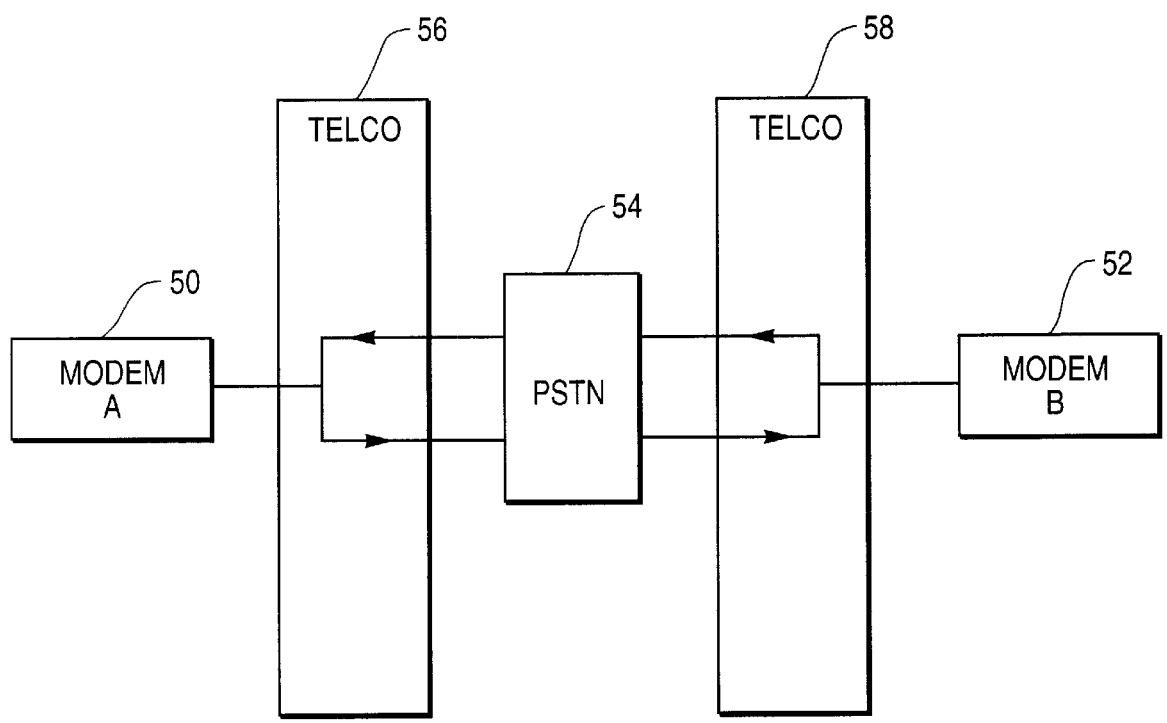
FIG. 1 is a block diagram of a known modem based communications system.

Still another important aspect of the invention relates to the storage in a table in a database of the call progress tone frequencies and associated cadences, type of call progress tone and the country in which the call progress tone was detected. be noted that although modem to modem communication is shown, the present invention may also be used with fax machines, voice mail systems, and other devices that use call progress tone detection methods. Further referring to FIG. 1, for example, a local modem A 50 communicates with a remote modem B 52 through the public switched telephone network (PSTN) 54. The modem A 50 which may be located at the subscriber's premises, and the modem B 52 which may be located at the on-line service provider (OSP) location, accesses the PSTN 54 through their respective telephone companies 56, 58.

The modems 50, 52 may each be connected to a personal computer (PC) 118 (FIG. 2) and/or server (not shown) which may, for example, instruct the calling modem A 50 to dial a telephone number associated with the modem B 52 or network the user is attempting to access. Typically, once the dialling command is sent by the PC 118 to modem 50, the modem 50 places the telephone line off hook and waits for a dial tone. Upon receiving a dial tone, the modem 50 then dials the number of the remote modem 52. At that time, the modem 50 listens for either a ringback tone, a busy tone or some other auxiliary tone. The modem 50 upon receiving a busy tone, notifies the user that the telephone number is busy by displaying a message on an output display 121. The modem 50 and/or client software may attempt to redial the busy number a predetermined number of times until a ringback tone is detected. The ringback tone indicates to the modem that the telephone line is not busy and that the remote modem may be available. Because different countries utilize different call progress tone frequencies for each type of call progress tone, a modem that is typically suitable for one country may not recognize call progress tones used in a different country.

Figure 2:
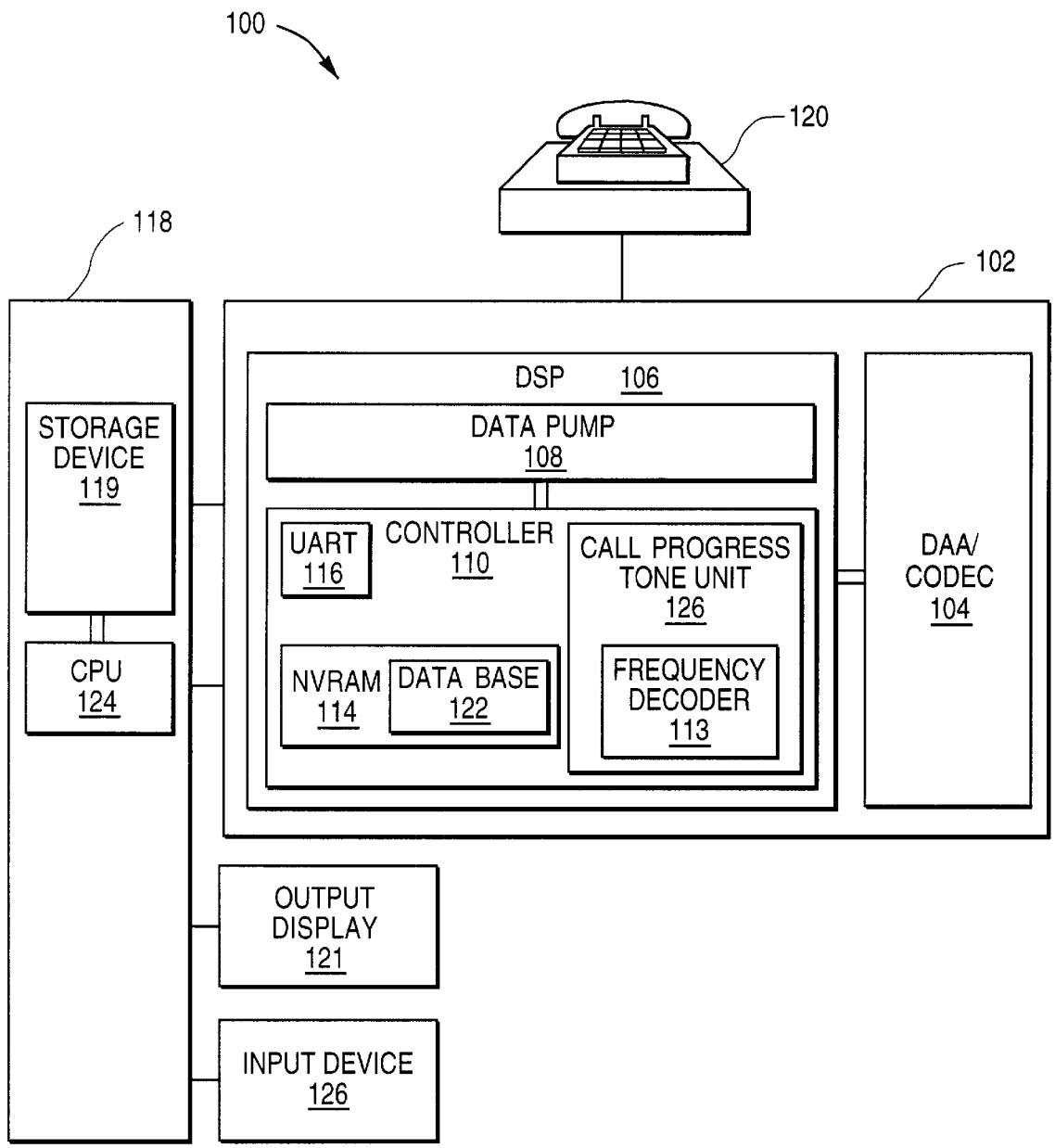
FIG. 2 is a block diagram of the adaptive call progress tone detection system in accordance with the present invention.

Referring to FIG. 2, an exemplary embodiment of the adaptive call progress tone detection system in accordance with the present invention, generally identified with the reference 100, is illustrated. By way of example only, the adaptive call progress tone detection system 100 is shown as being implemented in a modem 102 connected to a PC 118 and attached to the PSTN 54 through a telephone connection 120. It is to be noted the present invention may also be used with software based modems, typically referred to as controllerless and software modems and fax machines. Furthermore, voice mail systems seeking to interconnect using ANIS (analog protocol for long distance networking) between different countries often need to understand the call progress tones of new countries. The present invention enables a system administrator to train voice mail systems with the new tones.

The PC 118, which may also be any other type of communications server, includes a non-volatile storage device 119, such as a disk drive or flash RAM 114 for storing a communications program 121 to control the adaptive call progress tone detection system, as described below. The storage device 119 is interfaced to the CPU 124. The PC 118 is also interfaced to an input device 127 such as a keyboard and an output display 121 such as a computer monitor.

The modem 102 generally also includes a data access arrangement/coder/decoder (DAA/CODEC) 104 to interface the modem 102 to the PSTN 120. Also included, is a data pump 108 to provide signal modulation, a controller 110 to interpret the commands that initialize and control the modems 102 internal settings and an universal asynchronous receiver/transmitter (UART) 116 to interface the modem 102 to the computer 118.

The DAA/CODEC 104 provides the interface between the digital components of the modem and the analog telephone line. In particular, the CODEC converts the digital signal into analog format and the DAA tunes and balances the resulting analog signal to meet the requirements of the PSTN. In addition, the DAA characteristics can be changed to make the modem 102 compatible with various signalling and voltage level requirements for public telephone networks worldwide.

The data pump 108, which may be any general type of microprocessor, such as a 25 MHz 80186, provides signal modulation at different transmission rates and transmission types, such as ITU standard V.34+33.6 Kbps modulation. For high speed modem operation, such as ITU standard V.90 56 Kbps modulation, the data pump 108 must be a sufficiently powerful microprocessor operating at sufficiently fast clock speeds in order to execute the required high speed modulation methods. It should be noted that the present invention is not limited to the modems discussed herein, which are by way of example only. In particular, the present invention may be used in any analog, digital or other modem or communications device.

The modem controller 110, which is standard in most modems, is programmed to interpret standard commands, such as the Hayes compatible AT command set, to initialize and control the modem's 102 internal settings.

The modem controller 110 typically includes non-volatile random access memory (NVRAM) and/or a flash ram 114, to store default setting for the modem 102, which may be set using the industry standard AT command set.

The modem controller 110 may also include a frequency decoder for determining the particular call progress tone frequencies returned by the PSTN 54. Furthermore, the modem controller 110 may also include a call progress unit 126 and a database 122, that may be stored in the NVRAM 114.

The call progress unit 126 is responsible for executing the main part of the invention, such as tone frequency and cadence detection. In particular, the call progress unit 126 further includes one or more frequency decoders 127 for decoding the particular frequency of call progress tones and one or more cadence decoders 125 for determining the on/off pattern of each call progress tone. However, in many modern modem designs, the functions of the modem controller 110 and the data pump 108 are built into a single high speed digital signal processor (DSP) chip 106. This results in a reduction of the number of components used in modem design and a corresponding decrease in price. It should be noted that frequency and cadence decoding may be done by the DSP using known methods and algorithms, or using discrete hardware tone decoders. In particular, if a hardware implementation is desired, an MX613 available from MX-COM, INC. of Winston-Salem, N.C. may be used for decoding the audible tone signals and for cadence verification.

The communications program 123, which may be stored on the nonvolatile storage device 119, is used to control the adaptive call progress tone detection system. In particular, the communications program is used in conjunction with input from the user to program the system to adapt to various call progress tones by enabling the system to prompt the user to associate the particular type of call progress tone received by the modem with specific frequencies and cadences. Generally, the communications program may initiate a series of telephone calls in order to cause different progress tones and cadences to be generated by the PSTN 54.

As each tone and cadence is detected and decoded by the modem, the user will have the opportunity to specify the particular type of call progress tone that is being received, e.g., busy tone, ringback tone, etc. Furthermore, the user at some point may also specify the country from which the progress tones are originating. This information may then be stored in a table or database such that subsequent calls to, or within, the country generating the programmed progress tones may be automatically detected by the modem. Thus, subsequent intervention by user is eliminated and the call will progress in an expected manner each time the user interacts with the country generating the progress tone.

For example, the modem 102, the communications program 123 upon causing the modem 50 to dial the remote communications device, will receive a particular call progress tone. If the frequency decoder 113 of the modem does not recognize the particular tone frequency for the call progress tone, the frequency decoder 113 will sample the received tone and determine its frequency. The user may then manually associate the frequency of the received tone with a particular type of call progress tone, such as a busy tone, a dial tone or a ringback tone. In particular, the system will enable the user to confirm the type of call progress tone that was received. This may be accomplished by the system either requesting the type of tone the user received or by presenting one or more signal types from which the user may select the appropriate one. The prompts may be output on the display 121 by the communications software 123.

Upon receiving the call progress tone, the cadence decoder 125 will determine the on/off pattern of the particular call progress tone received. The decoded frequency and cadence may then be stored in a table in a database 122. As mentioned above, it should be noted that the functions of the frequency decoder 113 and the cadence decoder 125 may be done either in hardware or as a software program executed by the DSP.

As each tone is received, the call progress tone unit causes the PC 118 to output on the display 121 a prompt to the user to enter the particular type of call progress tone being received. The user may then enter the name of the particular call progress tone into the input device 126 or confirm a choice offered by the system. The country, the type of call progress tone and the frequency and cadence of each call progress tone is then stored in a table in the database 122. In addition, the system may also remove incorrect entries from the table in database 122.

For example, all countries may start with a default tone plan. But a country, e.g. Germany, may have a dial tone that is similar to the busy tone in the U.S. During storage of the dial tone, the system also checks the other table entries for that country to determine whether a similar frequency and cadence is incorrectly associated with a different type of tone. If a duplicate entry is found, then the system will update the dial tone entry and purge the table of the incorrect tone and/or cadence. entry is found, then the system will update the dial tone entry and purge the table of the incorrect tone and/or cadence.

Similarly, if regional or city difference exist within the country, the tones may be associated under the country name and city name, or any other unique name, the user wishes to assign to the particular call progress tones. The process described in the above example may be repeated for each type of progress tone for each different country.

It should be noted that the user is given the choice of entering call progress tone information into the system through a learning mode or a live mode. In learning mode, for example, a number of different telephone numbers may be called to generate the various possible progress tones. In particular, in learning mode, the user enters their own phone number or extension and this number may be dialed first. Accordingly, the system, in this manner, learns the dial tone and the busy tone of the country being called. Next, a known idle number may be entered and the system could call that number to learn the ringback tone.

In live mode, the system calls the intended destination and the user interacts with the system as described above. In particular, the user teaches the system the meaning of each call progress tone encountered. The learn and live modes may be combined as well if desired.

Figure 3A:
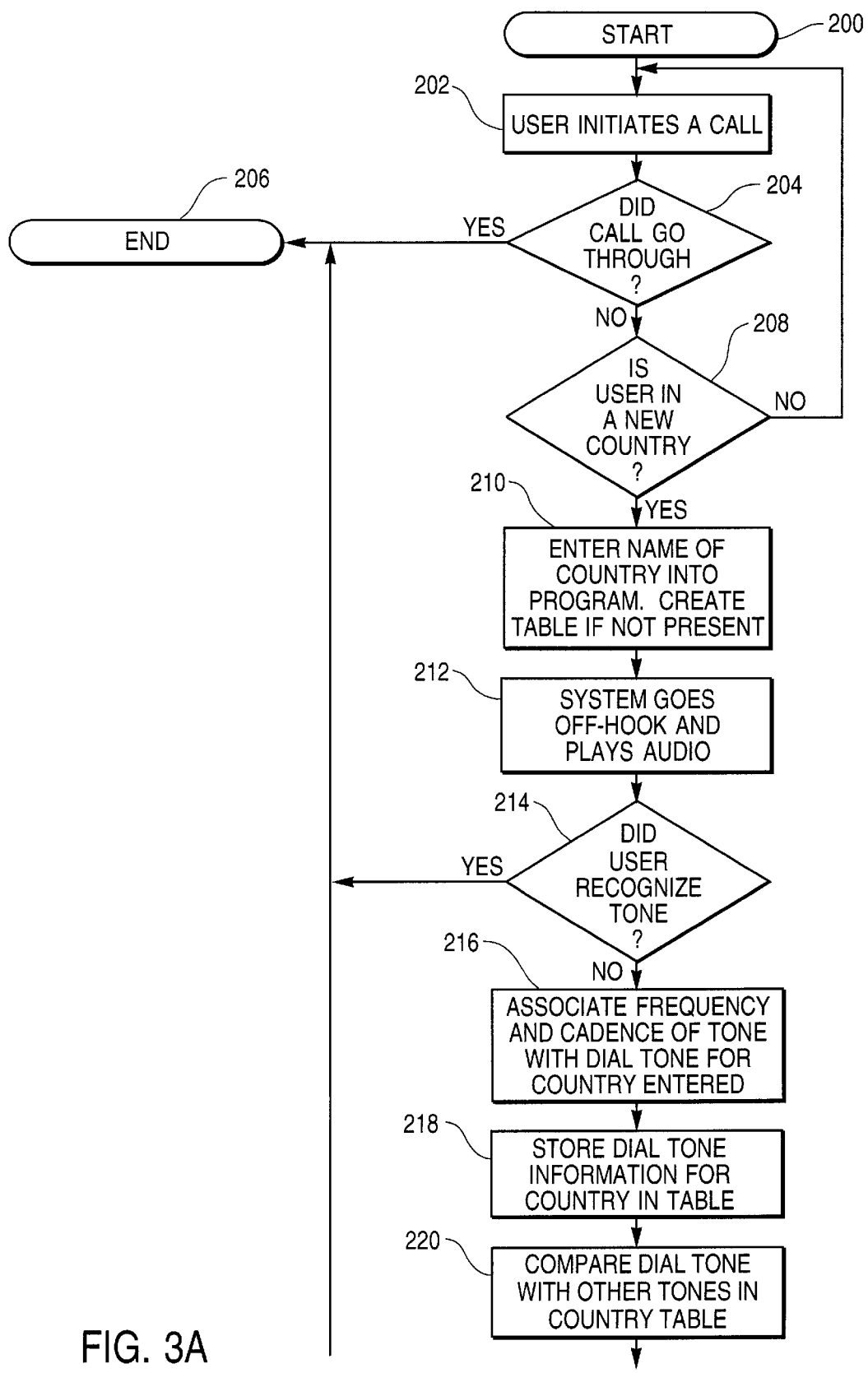
FIGS. 3A–3C together are a flow diagram of the adaptive call progress tone detection system in operation in accordance with the present invention.
Figure 3B:
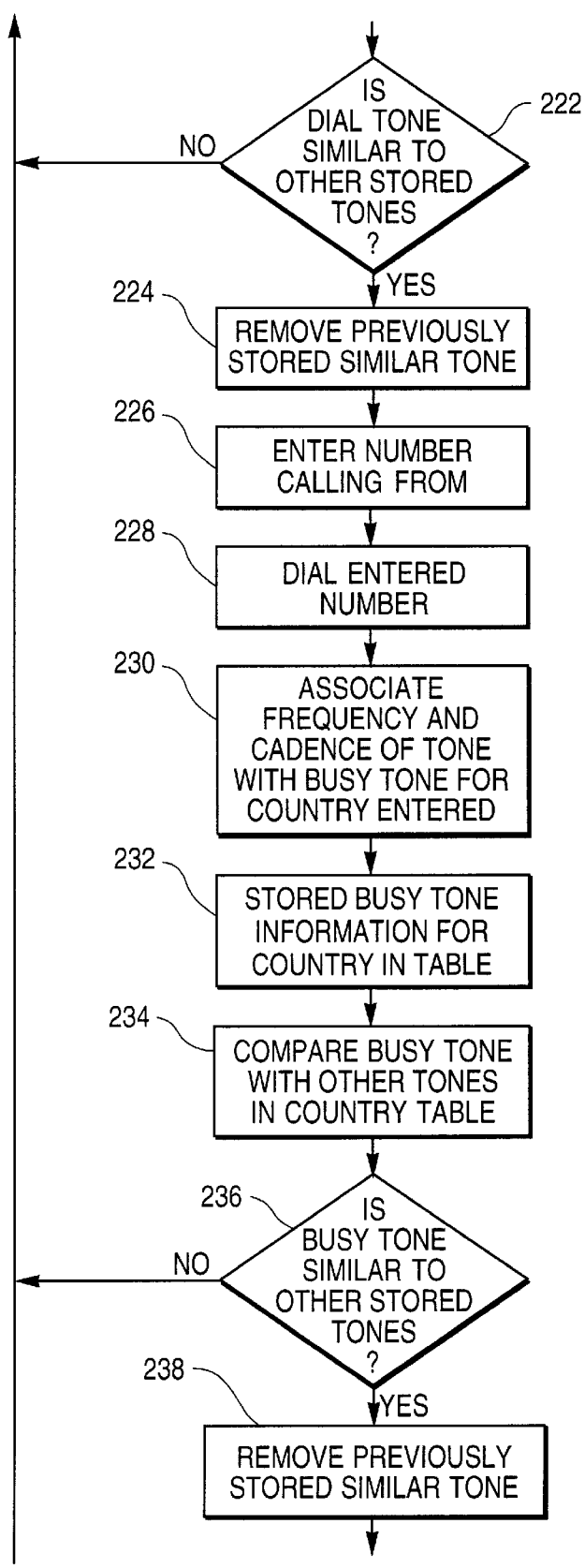
Figure 3C:
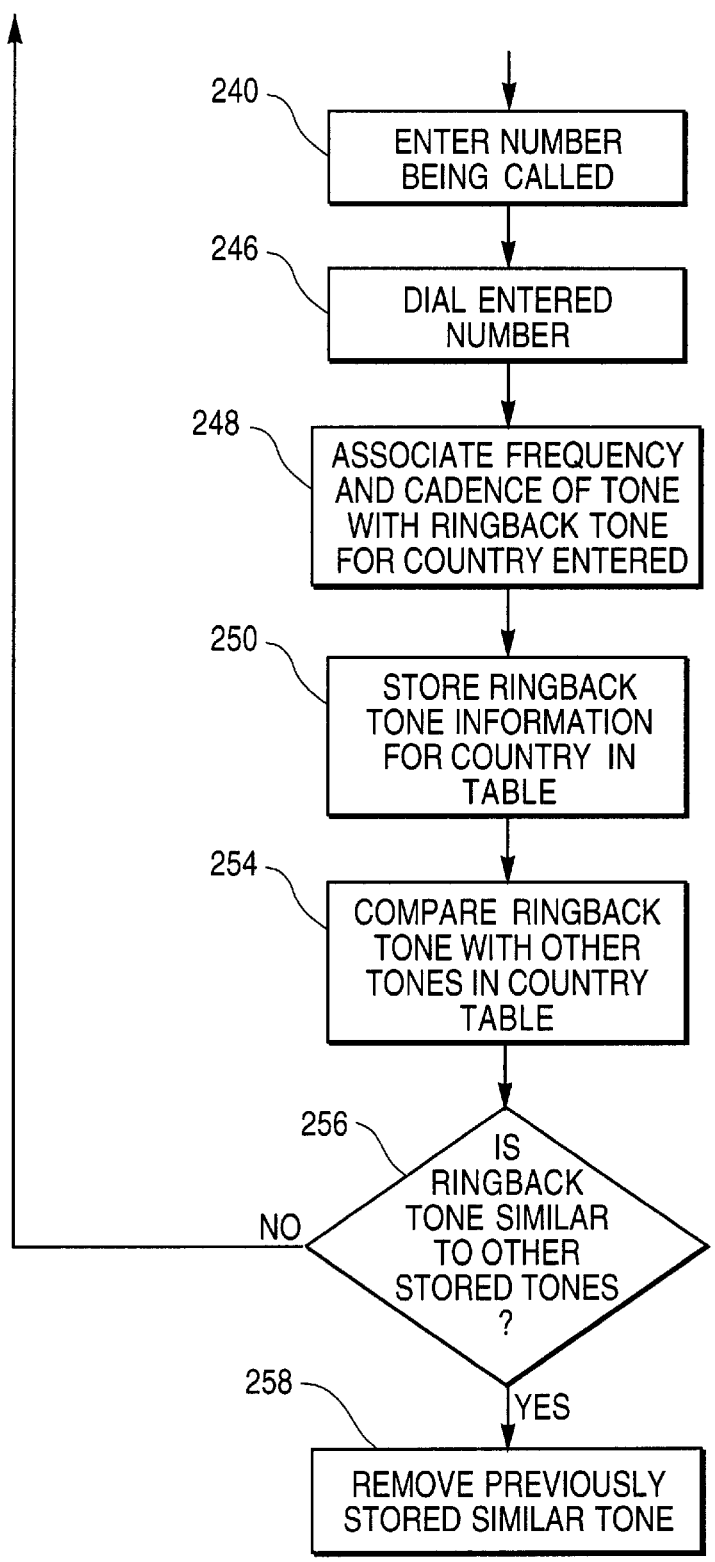

Referring to FIGS. 3A–3C, by way of example only, the call progress tone detection system is shown in operation. In particular, in step 202, the user initiates a call to a remote communications device. In step 204, the system determines whether the call went through. If the call connects properly to the remote device, then the system ends in step 206. However, if the call is not completed, then in step 208, the user determines whether the communications device is being used in a different country. If the communications device is not being used in a different country, the user once again initiates the call in step 202. However, if the device is being used in a different country, then in step 210 the user enters the name of the country country entered by the user. If such a table is not present, a new table is created. The system goes off hook in step 212 and plays phone-line audio through the speaker.

In step 214, the user determines whether the particular off hook tone is recognized. If so, then the system ends in step 206. However, if the tone is not recognized, then in step 216, the user associates the frequency and the cadence of the tone with the dial tone for the particular country entered. The system then stores the dial tone information for the country in the table in step 218. In step 220, the system compares the dial tone with other tones for that country in the country table. If it is determined in step 222 that the dial tone is similar to any other stored tone, then the previously stored similar tone is removed in step 224.

In step 226, the system instructs the user to enter the number that the user is calling from in order to generate a busy tone. The system in step 228 dials the entered number. In step 230, upon receiving the busy tone, the system associates the frequency and cadence of the tone with the country entered. In step 232, the system stores the busy tone information for the country in the table. In step 234, the busy tone is compared with other tones stored in the country table. In step 236, the system determines whether the busy tone is similar to other stored tones for that particular country. In step 238, the previously stored incorrect table entries are removed.

In step 240, the number being called is entered. The system in step 246 then dials the entered number. The system in step 248 associates the frequency and cadence of the tone with ringback tone for the country entered in the table. In step 250, the system stores the ringback tone information for the country in the table. In step 254, the system compares the ringback tone with other tones previously stored in the country table of the particular country. If it is determined that the ringback tone is similar to one or more other stored tones in step 256, then the previously stored incorrect table entry is removed in step 258.

Obviously, many modifications and variations of the present invention are possible in light of the above teachings. Thus, it is to be understood that, within the scope of the appended claims, the invention may be practiced otherwise than as specifically described above.

What is claimed is:

1. A call progress tone detection system, comprising:
   a frequency decoder configured to determine call progress tone frequencies;
   a cadence decoder configured to determine on and off patterns of said call progress tones;
   a memory configured to store said call progress tone frequencies and said on and off patterns; and
   means for learning said call progress tone frequencies in a first mode in which a plurality of known learning numbers are called and a second mode in which an actual call is made.

2. A call progress tone detection system as recited in claim 1, further including means for associating a predetermined country with each said stored tone and said on and off patterns.

3. A call progress tone detection system as recited in claim 1, said associating means including means for learning said call progress tone frequencies during a call.

4. A call progress tone detection system as recited in claim 1, said associating means including means for learning said on and off patterns during a call.

5. A call progress tone detection system as recited in claim 3, said learning means including means for comparing a learned call progress tone frequency with a stored call progress tone frequency.

6. A system as recited in claim 5, including means for updating a database based on said comparing.

7. A call progress tone detection system as recited in claim 4, said associating means including means for comparing a learned on and off pattern with a stored on and off pattern.

8. A system as recited in claim 7, including means for updating a database based on said comparing.

9. A call progress tone detection system as recited in claim 1, wherein said call progress tone is a dial tone.

10. A call progress tone detection system as recited in claim 1, wherein said call progress tone is a busy tone.

11. A call progress tone detection system as recited in claim 1, wherein said call progress tone is a ringback tone.

12. A call progress tone detection system as recited in claim 1, wherein said call progress tone is a congestion tone.

13. A call progress tone detection system as recited in claim 1, wherein said call progress tone is an auxiliary tone.

14. A method for call progress tone detection, comprising:
    determining call progress tone frequencies;
    determining on and off patterns of said call progress tones;
    storing said call progress tone frequencies and said on and off patterns in memory;
    wherein said determining said call progress tone frequencies occurs in a first mode in which a plurality of known learning numbers are called and in a second mode in which an actual call is made.

15. A method as recited in claim 14, including associating a predetermined country with each said stored tone and said on and off patterns.

16. A method as recited in claim 14, including learning said call progress tone frequencies during a call.

17. A method as recited in claim 16, including comparing a learned call progress tone frequency with a stored call progress tone frequency.

18. A method according to claim 16, including comparing a learned on and off pattern with a stored on and off pattern.

* * * * *